(12) United States Patent
Piccolo

(10) Patent No.: US 6,799,703 B1
(45) Date of Patent: Oct. 5, 2004

(54) DISPENSER

(76) Inventor: Michael F Piccolo, 1166 Base Line, Sault Ste. Marie, ON (CA), P6A 5K6

( * ) Notice: Subject to any disclaimer, the term of this patent is extended or adjusted under 35 U.S.C. 154(b) by 0 days.

(21) Appl. No.: 10/410,257

(22) Filed: Apr. 10, 2003

(51) Int. Cl.$^7$ .............................................. B65D 88/54
(52) U.S. Cl. .................................................. 222/321.6
(58) Field of Search ........................... 222/321.6, 321.7, 222/162

(56) References Cited

U.S. PATENT DOCUMENTS

| | | | |
|---|---|---|---|
| 2,567,496 A | * | 9/1951 | Pittenger .................. 222/321.6 |
| 4,608,045 A | | 8/1986 | Fretwell |
| 4,809,878 A | | 3/1989 | Rainey |
| 5,555,673 A | | 9/1996 | Smith |

* cited by examiner

*Primary Examiner*—Philippe Derakshani
(74) *Attorney, Agent, or Firm*—Michael M. Sakovich

(57) ABSTRACT

A liquid herbicide container having a closed end connected to a long handle and an open end coterminous with an externally threaded outlet conduit includes a spring biased pump inserted within the conduit into communication with the container body. A threaded cap is held rotatably captive with an open flange end of the pump and sealingly engages the flange with the threaded outlet conduit. Reciprocally captive within the pump, a discharge tube extending from the open flange end actuates the pump to withdraw the herbicide. A hollow coupler connected to an applicator pad has an open end adapted to slidably receive the cap and flange over an incursive distance adjustably limited by an annular ledge within the coupler, functioning alone or in combination with at least one resilient washer overlying the ledge. Advancing the flange into abutment with the annular ledge results in a corresponding incursive stroke of the discharge tube within the pump and withdrawal of a predetermined quantity of herbicide in direct proportion to the length of the stroke.

18 Claims, 3 Drawing Sheets

DISPENSER

FIELD OF THE INVENTION

The present invention relates to an apparatus for dispensing liquids and more particularly to such apparatus having a reliable liquid product metering system of simple and economical construction.

BRIEF DESCRIPTION OF THE PRIOR ART

Known product dispensers of various types are found in a wide range of structures, both simple and complex, having a liquid product metering capability. One such dispenser for controllably applying a liquid herbicide to noxious weeds via a contact pad is described in U.S. Pat. No. 5,555,673 Smith wherein, an elongated tube that functions as a handle and herbicide reservoir having a distal end normally closed by a valve assembly extending therefrom is held reciprocally captive within a short dispensing cylinder coupled to the pad. Reciprocal travel of the tube to open and close the valve is limited by a pair of stop screws extending from the cylinder into an annular channel formed by a pair of sleeves disposed in spaced relation on the distal end of the tube. Tube movement is thus limited by the distance traversed by the screws between the side walls of the channel.

Although simple in design, the dispenser is expected to be problematic due to excessive impact wear between the annular sleeves and stop screws. Furthermore, accurate metering of herbicide is not achieved since the quantity released at a given time is not predetermined but depends rather on the period that the valve remains open.

Another example of a dispenser for controlled release of a liquid is seen in U.S. Pat. No. 4,608,045 Fretwell which discloses an applicator for impressing ink brands or medicaments on animals. A short handle includes a chamber for liquids communicating with a base that is configured in a predetermined pattern through which a liquid product stored in the handle is applied to an animal. The handle includes a neck portion that is reciprocally captive within a short cylinder screwed into the base.

A valve assembly comprises a plunger valve in the distal end of the neck and a foot valve in the distal end of the cylinder, the valves being spaced apart to define a chamber of variable volume. Advancing the neck into the cylinder brings the valves together and compresses air in the chamber which expels product under pressure through the foot valve into the base and therethrough onto the animal. Return of the neck by a coil spring separates the valves and expands the chamber volume, resulting in a partial vacuum that opens the plunger valve and admits a predetermined quantity of product into the chamber for subsequent dispensing.

Incursion of the neck into the cylinder is controlled by a threaded sleeve positioned along the neck to adjust the distance between the distal end of the sleeve and the base. The chamber volume is thus varied which controls the partial vacuum pressure applied to the plunger valve and the amount of product drawn into the chamber.

Although the Fretwell applicator appears well adapted to serve as a branding and medicament application device with means for accurately metering out a product, its overall structure is complex in design and therefore not well suited to economical manufacture.

SUMMARY OF THE INVENTION

Having regard to the aforedescribed problems pertaining to the economical manufacture of a liquid product dispenser, and related problems associated with controllably metering out the product, a principal provision of the invention is a general purpose liquid product dispenser of reliable and cost-effective construction.

A further provision of the invention is a liquid product dispenser employing a simple liquid product metering system that is easily adjusted in the field.

Yet another provision of the invention is an adjustable liquid product metering system that includes a resilient cushion to absorb impact forces incurred in normal dispenser operation.

The problems associated with the prior art may be substantially overcome and the foregoing provisions achieved by recourse to the invention which, in one aspect thereof, relates to a dispenser, comprising in combination, a liquid product container having a closed end and an open end coterminous with an outlet conduit, pump means comprising a spring biased pumping assembly housed in a cylindrical body portion removably inserted within the conduit into communication with the interior of the container, closure means sealingly engaging the body portion with the free end of the conduit, and a discharge tube reciprocally captive within the body portion and extending therefrom for actuating the pumping assembly and withdrawing a predetermined quantity of the product. A hollow coupler having an open end is adapted to receive the closure means and discharge tube in axially slidable relation. Stop means disposed within the coupler at a predetermined distance from the open end adjustably limits incursion of the closure means. An end wall of the coupler includes a central aperture circumscribed by a cylindrical surface that engages the free end of the discharge tube in an interference fit, permitting displacement of the closure means into abutment with the stop means that results in a corresponding incursive stroke of the discharge tube within the body portion and withdrawal of a predetermined quantity of the product in direct proportion to the length of the stroke.

Still another aspect of the invention relates to a method for controllably withdrawing a predetermined quantity of product carried in a dispenser that comprises, in combination, a liquid product container having a closed end and an open end coterminous with an outlet conduit, pump means comprising a spring biased pumping assembly housed in a cylindrical body portion removably inserted within the conduit into communication with the interior of the container, closure means sealingly engaging the body portion with the free end of the conduit, a discharge tube reciprocally captive within the body portion and extending therefrom for actuating the pumping assembly, and a hollow coupler having an open end. The method comprises the steps of, inserting the closure means and discharge tube into the coupler in axially slidable relation, providing stop means within the coupler at a predetermined distance from the open end to adjustably limit incursion of the closure means, providing an end wall in the coupler with a central aperture therein circumscribed by a cylindrical surface engaging the free end of the discharge tube in an interference fit, displacing the closure means into abutment with the stop means to effect a corresponding incursive stroke of the discharge tube within the body portion, and withdrawing a predetermined quantity of the product in direct proportion to the length of the stroke.

BRIEF DESCRIPTION OF THE DRAWINGS

The invention will now be more particularly described with reference to an embodiment thereof shown, by way of example, in the accompanying drawings in which.

DETAILED DESCRIPTION OF THE PREFERRED EMBODIMENT

Figure 1:
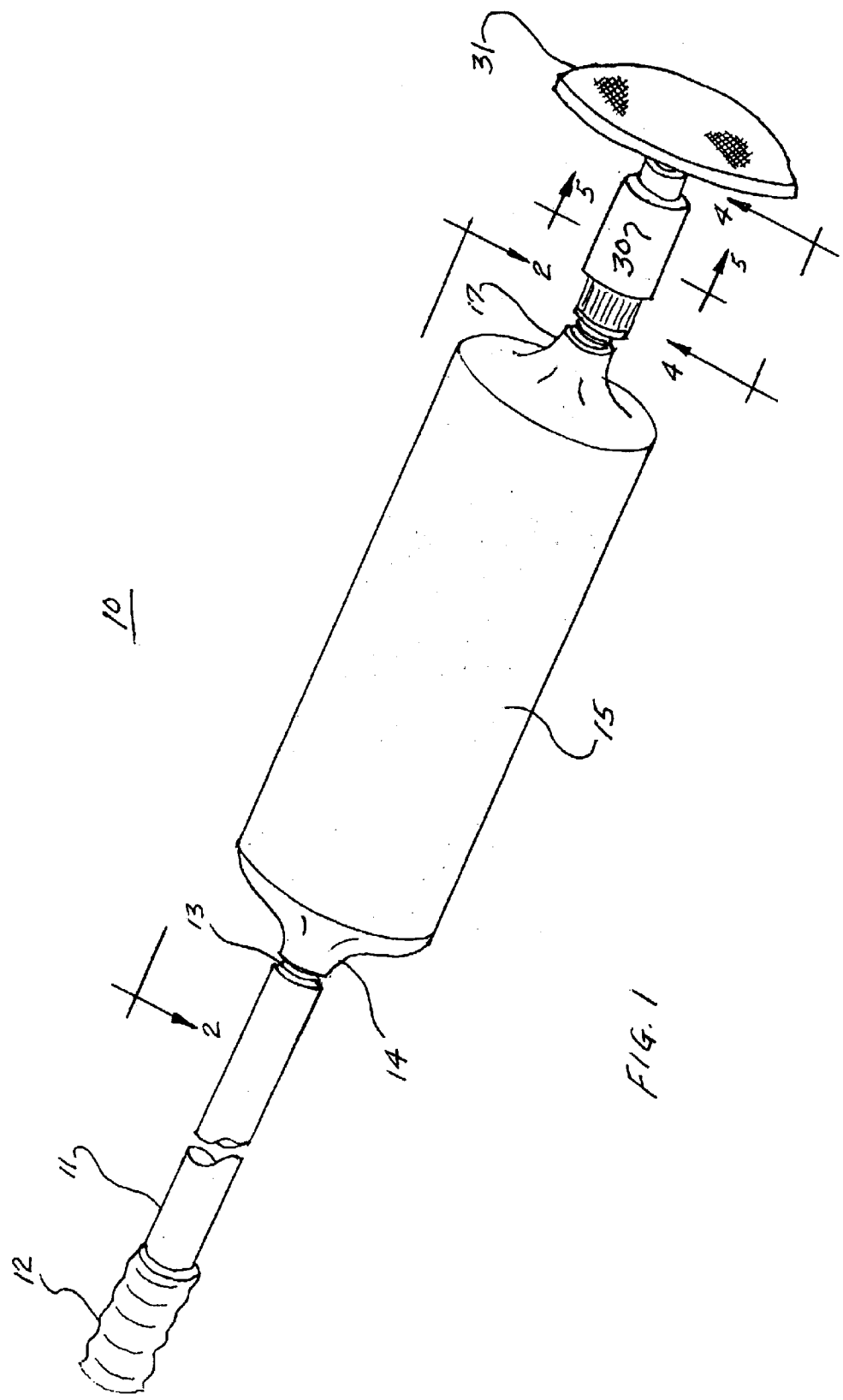
FIG. 1 is a perspective view of a dispenser in accordance with the invention.
Figure 2:
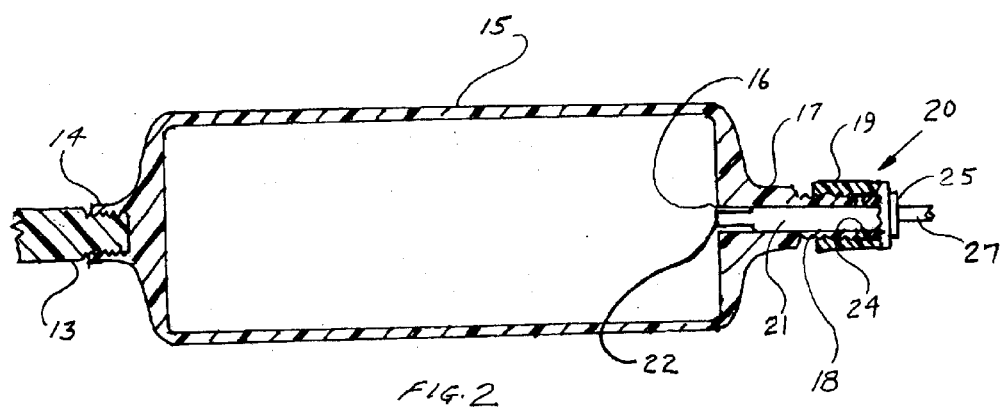
FIG. 2 is a sectional view taken along the lines 2—2 of a liquid product container shown in the dispenser of FIG. 1.

A herbicide dispenser 10 illustrated in FIG. 1 reveals a longitudinally extended handle 11 having a hand-grip 12 at a proximate end thereof and a distal end 13 that is threadedly joined to a correspondingly threaded closed end 14 of a liquid herbicide container 15. An open end 16 (FIG. 2) opposite the closed end 14 is shown to be coterminous with an extended outlet conduit 17 having an externally threaded end 18 and is threadedly connected to a cap 19 of a pump 20, a known spring-biased piston/cylinder type as described in U.S. Pat. No. 4,809,878 Rainey, the disclosure of which is incorporated herein by reference.

Figure 3:
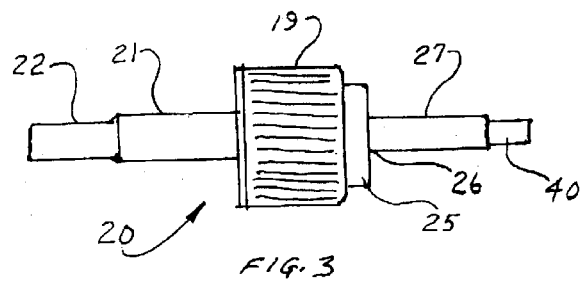
FIG. 3 is a side elevation view of a pump utilized in the dispenser of FIG. 1.

A side elevation view of the pump 20 in FIG. 3 depicts a cylindrical body 21 that houses a pumping assembly (not shown) of the pump. The body 21 is axially inserted into the conduit 17 and a dip tube 22 extends from an inlet of the body into communication with the interior of the container 15.

The cap 19 is formed with internal threads 23 engageable with the threaded end 18 to draw the cap and a resilient seal 24, circumscribing the body 21 as indicated, into sealing engagement with the free end of the conduit 17. In addition to its sealing function, the seal 24 holds the closed end of the cap 19 rotatably captive between the seal and a flange 25 which circumscribes an open end 26 of the pump body 21.

A discharge tube 27 is reciprocally captive within the body 21 and extends from the end 26, outwardly of the flange 25, for actuating the pumping assembly and withdrawing a predetermined quantity of herbicide stored in the container 15. Herbicide extracted from the container 15 is conveyed via a hollow coupler 30 to an applicator 31.

Figure 4:
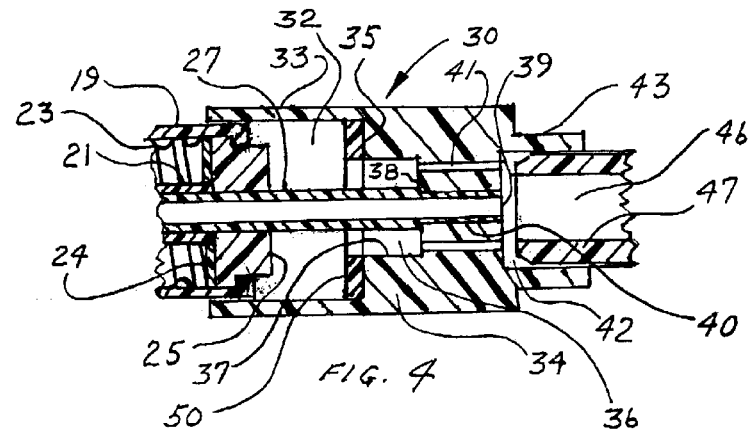
FIG. 4 is a sectional view taken along the lines 4—4 of a coupler shown in the dispenser of FIG. 1.

A sectional view of the coupler 30 in FIG. 4 indicates that it is of integral construction with an open receiving end 32 defined by a first cylindrical wall 33 in axial alignment with the pump 20 and the inner surface of the wall 33 in slidable engagement with the outer surface of the cap 19. Intruding radially inwardly of the wall 33, a second cylindrical wall 34 forms a flat annular ledge 35 at a predetermined distance from the end 32. A cavity 36 is defined by an innermost cylindrical surface 37 of the wall 34 and an end wall 38 having a central aperture 39 therethrough circumscribed by a convergingly tapered surface engaging a stepped free end 40 of the tube 27 in a secure interference fit.

Figure 5:
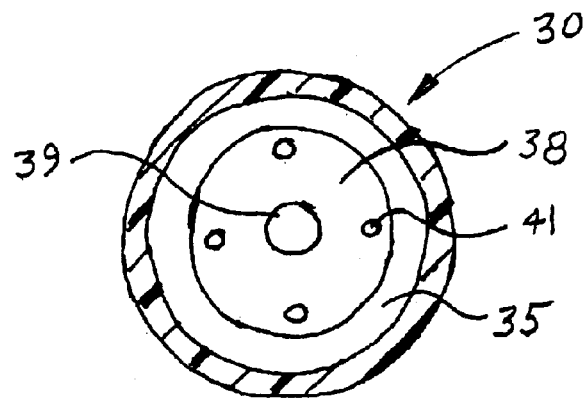
FIG. 5 is a sectional view taken along the lines 5—5 of a coupler shown in the dispenser of FIG. 1.

FIG. 5 is a cross-sectional view of the open end of the coupler 30 showing the end wall 38 and aperture 39 together with four smaller apertures 41 that function as drains for the cavity 36 to continuously carry away any small amount of herbicide that may leak from the body 21 when the pump 20 is actuated by the tube 27. Any leaked herbicide drains into a discharge port 42, defined by a third cylindrical wall 43 comprising a coaxial extension of the wall 34, and therefrom into the applicator 31. Since any leaked herbicide is not permitted to accumulate, reasonably accurate metering of the herbicide is maintained.

Figure 6:
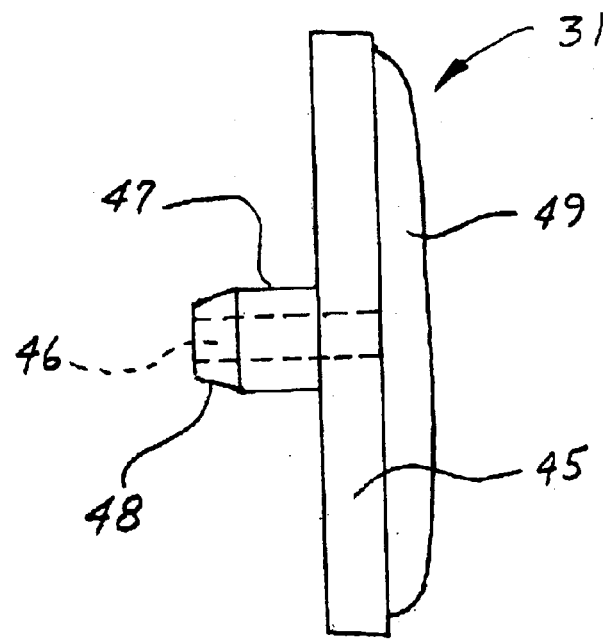
FIG. 6 is a side elevation view of an applicator shown in the dispenser of FIG. 1.

FIG. 6 is a side elevation view of the applicator 31 which comprises a circular disk 45 having a central aperture 46 therethrough, shown in broken line form, and a tubular connector 47, formed integrally with the disk 45, that extends coaxially outwardly from the aperture 46. The connector 47 includes a frustoconical tip 48 to facilitate entry into the port 42 and to acquire a secure interference fit with the inner surface of the wall 43. Herbicide pumped into the connector 47 is conducted through the aperture 46 onto an absorbent pad 49 from which the herbicide may be daubed onto undesirable vegetation. Protection for the pad 47 is optionally provided in the form of a mesh (not shown) to minimize pad damage when used in rough terrain.

Dispensing herbicide in accurately metered quantities is determined by the interaction of the pump 20 and the coupler 30. Initially, the cap 19 is inserted into the open end 32 of the coupler to seat the end 40 of the tube 27 into engagement with the tapered aperture 39 as described. The pump 20 is primed by applying a downward pressure via the handle 11, advancing the cap 19 into the open end 32 until contact is made between the free end of the flange 25 and the annular ledge 35 which functions as a stop to limit incursion of the flange into the coupler and, correspondingly, the tube 27 stroke into the pump body 21. Release of downward pressure permits a return spring (not shown) within the pump body 21 to retract the tube 27 and to draw a quantity of herbicide into the pump body 21 via the dip tube 22. The quantity is predetermined by the length of the dip tube stroke. Correspondingly, the cap 19 and flange 25 assembly also retracts to its initial position by the return spring. With each subsequent stroke cycle, the herbicide drawn into the pump body 21 is expelled via the discharge tube 27 into the port 42 for distribution via the applicator 31 and fresh herbicide is drawn into the pump body through the dip tube 22.

Potentially damaging impact shock between the flange 25 and the annular ledge 35 is absorbed by a resilient washer 50 placed in overlying contact with the ledge 35, thereby substantially eliminating the likelihood of fractures developing in the pump 20 and the coupler 30. In addition to this benefit, the washer may be fabricated in various thicknesses to adjust the stroke length of the tube 27 and thus the metered quantity of herbicide drawn from the container 15. A single washer may suffice, although a plurality of washers may be used to acquire a desired thickness for adjusting the length of stroke. Whereas a flat resilient washer 50 is illustrated in FIG. 4, it will be understood that a conventional resilient "O" ring would be an effective substitute.

To those skilled in the art to whom this specification is addressed, it will be apparent that the embodiment aforedescribed may be varied to meet particular specialized requirements without departing from the true spirit and scope of the invention disclosed. For example, although the invention is described in the context of a herbicide dispenser, the principles thereof will find equal application in a dispenser for paint used in road marking, and dyes for marking terrain at construction sites, as well as applying medicaments to animals and marking dyes for animal identification purposes. The embodiment described herein is therefore not to be taken as indicative of the limits of the invention, but rather as an exemplary structure thereof which is described by the claims appended hereto.

I claim:

1. A dispenser, comprising in combination:
   a liquid product container having a closed end and an open end coterminous with a threaded outlet conduit;
   pump means comprising a spring biased pumping assembly housed in a cylindrical body portion removably inserted within the conduit into communication with the interior of the container, closure means sealingly engaging the body portion with the free end of the conduit, and a discharge tube reciprocally captive within the body portion and extending therefrom for actuating the pumping assembly and withdrawing a predetermined quantity of the product; and
   a hollow coupler having an open end adapted to receive the closure means and discharge tube in axially slidable relation, stop means disposed within the coupler at a predetermined distance from the open end to adjustably limit incursion of the closure means, and an end wall having a central aperture circumscribed by a cylindrical surface engaging the free end of the discharge tube in an interference fit, whereby displacement of the closure means into abutment with the stop means results in a corresponding incursive stroke of the discharge tube within the body portion and withdrawal of a predetermined quantity of the product in direct proportion to the length of the stroke.

2. A dispenser as claimed in claim 1, wherein the coupler is of integral construction and the open end is defined by a first cylindrical wall.

3. A dispenser as claimed in claim 2, wherein the stop means comprises an annular ledge formed by a second cylindrical wall intruding radially inwardly of the first cylindrical wall.

4. A dispenser as claimed in claim 3, wherein the coupler includes a discharge port defined by a third cylindrical wall comprising a coaxial extension of the second cylindrical wall.

5. A dispenser as claimed in claim 4 wherein the closure means comprises an annular flange circumscribing an open end of the pump body portion and a cylindrical cap in rotatably captive engagement with the flange, the cap having internal threads engageable with the threads of the conduit for drawing the flange into sealing contact with the free end of the conduit.

6. A dispenser as claimed in claim 5, including an applicator comprising a disk having a central aperture therethrough and a tubular connector formed integrally with the disk and extending axially outwardly from the aperture into engagement with the discharge port.

7. A dispenser as claimed in claim 6, wherein the applicator includes an absorbent pad affixed to the free side of the disk.

8. A dispenser as claimed in claim 3, further comprising at least one washer in overlying contact with the annular ledge to adjust the incursion of the closure means, and incursive stroke of the discharge tube.

9. A dispenser as claimed in claim 8 wherein the at least one washer comprises at least one of, a flat washer and "O" ring.

10. A dispenser as claimed in claim 9, wherein the at least one washer is resilient.

11. A dispenser as claimed in claim 7, wherein the container comprises an elongated cylindrical bottle having an internally threaded, external connector formed integrally with the closed end in substantially coaxial relation with the outlet conduit.

12. A dispenser as claimed in claim 11, further comprising a longitudinally extended carrying handle having a hand grip at one end and a threaded opposite end adapted to threadedly engage the internally threaded, external connector of the bottle.

13. A dispenser as claimed in claim 4, wherein the end wall defines a cavity with the second cylindrical wall and includes at least one drain aperture communicating with the discharge port.

14. A dispenser as claimed in claim 13, wherein the free end of the discharge tube has a reduced diameter to form a stepped shoulder that abuts the end wall.

15. A dispenser as claimed in claim 6, wherein the tubular connector includes a frustoconical tip adapted to engage the inner surface of the third cylindrical wall in an interference fit.

16. A dispenser as claimed in claim 7, wherein the absorbent pad includes an overlying flexible protective mesh attached to the disk.

17. In a dispenser, comprising in combination, a product container having an open end coterminous with an outlet conduit terminating in a threaded free end, a pump comprising a dip tube having a first end inserted through the conduit into communication with the interior of the container, a second end joined to a body portion housing a spring biased pumping assembly, an annular flange circumscribing an open end of the body portion, a cylindrical cap in rotatably captive engagement with the flange, the cap having internal threads engageable with the threads of the conduit for drawing the flange into sealing contact with the free end of the conduit, and a discharge tube reciprocally captive within the body portion for actuating the pumping assembly and withdrawing a predetermined quantity of the product,
   the improvement of:
      a coupler of integral construction having an open receiving end defined by a first cylindrical wall coaxially aligned with the pump and in slidable engagement with the cap and discharge tube, an annular ledge formed by a second cylindrical wall intruding radially inwardly of the first cylindrical wall at a predetermined distance from the receiving end, and an end wall defining a cavity with the second cylindrical wall, the end wall having a central aperture circumscribed by a cylindrical surface engaging the free end of the discharge tube in an interference fit.

18. A method for controllably withdrawing a predetermined quantity of liquid product carried in a dispenser that comprises, in combination, a product container having a closed end and an open end coterminous with an outlet conduit, pump means comprising a spring biased pumping assembly housed in a cylindrical body portion removably inserted into the conduit, a dip tube extending from an inlet of the body portion into the container, closure means sealingly engaging the pump body portion with the free end of the conduit, a discharge tube reciprocally captive within the body portion and extending therefrom for actuating the pumping assembly, and a hollow coupler having an open entry end, the method comprising the steps of:
   inserting the closure means and discharge tube into the open entry end in axially slidable relation;
   providing stop means within the coupler at a predetermined distance from the open entry end to adjustably limit incursion of the closure means;
   providing an end wall in the coupler with a central aperture therein circumscribed by a cylindrical surface;
   engaging the free end of the discharge tube in an interference fit with the cylindrical surface;
   displacing the closure means into abutment with the stop means to effect a corresponding incursive stroke of the discharge tube within the body portion; and,
   withdrawing a predetermined quantity of the product in direct proportion to the length of the stroke.

* * * * *